US011227699B2

(12) United States Patent
Faga et al.

(10) Patent No.: US 11,227,699 B2
(45) Date of Patent: Jan. 18, 2022

(54) METHOD FOR PRODUCING A FRACTION OF XENON RADIOISOTOPES, IN PARTICULAR XE-133, FRACTION OF XENON RADIOISOTOPES, IN PARTICULAR XE-133

(71) Applicant: INSTITUT NATIONAL DES RADIOÉIÉMENTS, Fleurus (BE)

(72) Inventors: Philippo Faga, Châtelineau (BE); Dominique Moyaux, Court-Saint-Etienne (BE); Benoit Deconninck, Vedrin (BE)

(73) Assignee: Institut National Des Radioeléménts, Fleurus (BE)

( * ) Notice: Subject to any disclaimer, the term of this patent is extended or adjusted under 35 U.S.C. 154(b) by 162 days.

(21) Appl. No.: 16/312,192

(22) PCT Filed: Jun. 28, 2017

(86) PCT No.: PCT/EP2017/066036
§ 371 (c)(1),
(2) Date: Dec. 20, 2018

(87) PCT Pub. No.: WO2018/002161
PCT Pub. Date: Jan. 4, 2018

(65) Prior Publication Data
US 2019/0237211 A1 Aug. 1, 2019

(30) Foreign Application Priority Data

Jun. 28, 2016 (BE) .................................. 2016/5496

(51) Int. Cl.
*G21G 1/00* (2006.01)
*B01J 20/18* (2006.01)

(52) U.S. Cl.
CPC ............ *G21G 1/001* (2013.01); *B01J 20/186* (2013.01); *B01J 2220/58* (2013.01); *G21G 2001/0094* (2013.01)

(58) Field of Classification Search
CPC ............................... G21G 1/001; B01J 20/186
See application file for complete search history.

(56) References Cited

U.S. PATENT DOCUMENTS

2003/0106335 A1* 6/2003 Golden .................. B01D 53/04
62/648

FOREIGN PATENT DOCUMENTS

WO  99/41755 A1  8/1999

OTHER PUBLICATIONS

J. Salacz, Reprocessing of irradiated Uranium 235 for the production of Mo-99, I-1331, Xe-133 radioisotopes. (Year: 1985).*
Christophe Gueibe et al. Open REport SCK.CEN-BLG-1099. (Year: 2014).*
PaulR.J.Saeyetal.,Isotopicnoblegassignaturesreleasedfrommedicalisotopeproductionfacilities—Simulationsand measurements,AppliedRadiationandIsotopes,68, 1846-1854. (Year: 2010).*
LudovicDeliereetal.,BreakthroughinXenonCaptureandPurificationUsingAdsorbent-SupportedSilverNanoparticles,Chem.Eur.J,22,9660-9666. (Year: 2016).*
Written Opinion of the International Searching Authority dated Sep. 29, 2017, issued in corresponding International Application No. PCT/EP2017/066036, filed Jun. 28, 2017, 5 pages.
International Preliminary Report on Patentability dated Jan. 1, 2019, issued in corresponding International Application No. PCT/EP2017/066036, filed Jun. 28, 2017, 1 page.
Gueibe, C., et al., "Xenon Mitigation Project—Phase I: Adsorption Materials," Open Report SCK-CEN-BLG-1099, SCK-CEN, Boeretang, Belgium, Jun. 2014, 46 pages.
Salacz, J., "Reprocessing of Irradiated Uranium 235 for the Production of Mo-99, I-131, Xe-133 Radioisotopes," Revue IRE Tijdschrift 9(3):22-28, Jan. 1985.
International Search Report dated Sep. 29, 2017, issued in corresponding International Application No. PCT/EP2017/066036, filed Jun. 28, 2017, 7 pages.

* cited by examiner

*Primary Examiner* — Michael G. Hartley
*Assistant Examiner* — Jagadishwar R Samala
(74) *Attorney, Agent, or Firm* — Christensen O'Connor Johnson Kindness PLLC

(57) ABSTRACT

A method for producing a fraction of xenon radioisotopes, comprising the steps of dissolving enriched uranium targets forming a slurry and a gaseous phase containing xenon radioisotopes, isolating the xenon radioisotopes using zeolite doped with silver, preferably chosen from the group consisting of aluminosilicates doped with silver, titanosilicates doped with silver and mixtures thereof, and recovering the fraction of xenon radioisotopes, in particular Xe-133.

13 Claims, No Drawings

METHOD FOR PRODUCING A FRACTION OF XENON RADIOISOTOPES, IN PARTICULAR XE-133, FRACTION OF XENON RADIOISOTOPES, IN PARTICULAR XE-133

The present invention relates to a method for producing a fraction of xenon radioisotopes, in particular Xe-133, comprising the steps of:

(i) Alkaline (or based) dissolution of enriched uranium targets with obtaining of an alkaline (or based) slurry containing aluminium salts and isotopes generated from the fission of highly-enriched uranium and a gaseous phase containing xenon radioisotopes, in particular Xe-133, as a fission product of uranium, (ii) Isolation of the said gaseous phase containing said Xenon radioisotopes, in particular Xe-133, and (iii) Recovering a fraction containing said xenon radioisotopes, in particular Xe-133.

Such a method for producing a fraction of iodine radioisotopes, in particular iodine-131 is described in the document "Reprocessing of irradiated Uranium 235 for the production of Mo-99, I-131, Xe-133 radioisotopes. J. Salacz—review IRE tijdschrift, vol 9, No. 3 (1985)".

According to this document, the treatment of fission products of uranium for the purpose of producing short-lived radioisotopes involves working conditions that are particularly restrictive.

These particularly restrictive working conditions entail among other things working in shielded cells and with robotised claws or manipulated outside of shielded cells by the manipulators of the production chain. Once the processes for treating targets containing highly-enriched uranium are well established and secured, so that the pollution of the environment is nil or very low, the process for producing radioisotopes is clearly fixed. The slightest modification of these methods is avoided as far as possible in order to avoid disturbing the production scheme, insofar that when the level of pollution of the environment is considered to be secure, each modification is considered to be a new risk to be managed for the purpose of obtaining a new design that satisfies the environmental constraints. In addition, the method is carried out in cells that include lead-armoured glass portholes several tens of cm thick and through which pass articulated arms manipulated from the outside, robotised or not robotised.

There is a succession of several cells. In each cell, a portion of the method is carried out.

A first cell is dedicated to the dissolution of highly-enriched uranium targets that forms a slurry. The dissolution is accompanied by the release of the Xenon radioisotopes, in particular Xe-133 Xenon, which is a fission product of uranium.

Indeed, as soon as the irradiated target is dissolved, the Xenon trapped in the enriched uranium targets is released in the form of a gaseous phase since the Xenon is present in gaseous form starting at −109° C. At this stage, the gaseous phase comprises the Xenon radioisotopes, in particular Xe-133, but also other fission products in gaseous form, such as for example Kr-85, but also the gases coming from the dissolution of the targets during the exothermic dissolution reaction, such as for example $NH_3$, nitrogen oxides, etc.

According to this document, the presence of water and ammonia must imperatively be avoided during the capture of Xenon, which is why the isolated gaseous phase is passed beforehand through a molecular sieve which makes it possible to capture the water and ammonia first.

According to this document, the first gaseous phase is then passed through copper shavings before it is purified.

Indeed, copper presents excellent thermal conductivity properties and therefore favours the capture of Xenon.

The Xenon radioisotopes, in particular Xe-133 being released in the form of gas at the dissolution of the enriched uranium targets, must be isolated with great efficacy in order to prevent them from escaping into the ventilation system and from contaminating the atmosphere, or simply the filters of the ventilation system.

The production of radioisotopes for medical use was for a long time carried out using highly-enriched uranium.

Highly-enriched uranium (HEU) represents a challenge in terms of worldwide security due to its relative vulnerability with regard to terrorist groups and its potential in developing nuclear weapons. Although many facilities that produce radioisotopes for medical use have robust security measures, minimising the use of highly-enriched uranium for civil purposes is a major action in order to reduce the risk of proliferation.

Despite the increased efficiency in producing radioisotopes using HEU, whether from an economic or environmental standpoint, the conversion of the method for producing radioisotopes using HEU is substantially restricted by the USA, the main source of uranium of the raw material. The United States has just taken all of the measures required to promote the use of LEU via compensatory measures to the use of radioisotopes produced from low-enriched uranium (LEU), by introducing limitations concerning the purchase and delivery of HEU, or even further by penalties for using radioisotopes produced from HEU.

It is in this context that there is therefore a need to develop a method that makes it possible to produce fractions of xenon radioisotopes, in particular Xe-133 that are substantially pure and that allows a satisfactory compromise to be reached in terms of the environmental safety of the production method, but also reducing the use of highly-enriched uranium.

Unfortunately, given that the quantity of radioisotopes is directly linked to the quantity of fissile uranium-235, and in order to guarantee the same level of procurement for medical radioisotope Xe-133, low-enriched uranium targets globally contain much more uranium than highly-enriched uranium targets and therefore contain substantially more material that cannot be used (up to 5 times more).

It is therefore advantageous according to the present invention to be able to process in the method low-enriched uranium targets, despite the presence of contaminants that differ greatly from those coming from highly-enriched uranium targets, but which increases the environmental safety, while still maintaining/improving the purity by focussing on the selectivity with regard to xenon radioisotopes, in particular Xe-133 as well as by maintaining the qualitative criteria of the fractions of xenon radioisotopes, in particular Xe-133.

To solve this problem, according to the present invention a method for producing a fraction of xenon radioisotopes, in particular Xe-133 is provided, making it possible to improve the level of environmental safety, but also to reduce the use of highly-enriched uranium in the production of radioisotopes for medical use.

In this way, a new method for producing xenon radioisotopes has been developed as a by-product of the production of other radioisotopes coming from the fission of uranium, operating with complete autonomy by making available an entirely "passive" method contrary to cryogenic traps that require a continuous supply of liquid nitrogen. This has made it possible to improve the safety of the method and the environmental security.

The present invention therefore provides a method such as mentioned in the beginning, characterised in that said uranium targets are low-enriched uranium targets and in that said isolation of said gaseous phase containing said xenon radioisotopes, in particular Xe-133 comprises a step of adsorbing xenon radioisotopes, in particular Xe-133 on a zeolite doped with silver, preferably chosen from the group consisting of aluminosilicates doped with silver, titanosilicates doped with silver and their mixtures.

Although zeolites, in particular zeolites doped with silver preferably chosen from the group consisting of aluminosilicates doped with silver, titanosilicates doped with silver and of their mixtures have been studied for a long time for their affinity for noble gases, the feasibility of an isolation of fractions of xenon radioisotopes, in particular Xe-133 remained an uncertain and vague hypothesis.

Indeed, the following documents relate to the capture of xenon by such zeolites: US2012/0144999, XPS Characterization of Silver Exchanged ETS-10 and Mordenite Molecular Sieves—A. Anson and coll., Journal of Nanoscience and Nanotechnology, vol 9—3134-3137—2009), "Xenon mitigation project" Gueibe and coll., June 2014.

However, these documents typically disclose the separation and/or the capture of xenon using the gaseous phases per se containing non-radioactive xenon, for example mixtures of air containing xenon as an element to be separated (purification) or mainly for the purpose of capturing it and allowing it to decay before being able to release it. Indeed, the quantity of radioactive xenon produced during production is reduced, and the first desire is to capture it in order to prevent it from entering the ventilation system and/or the release of radioactive xenon into the surrounding atmosphere, but not to valorise it. Therefore, the xenon would be stored until it is no longer radioactive, passively.

In the context of producing radioisotopes for medical use, during the dissolution, the gaseous phase produced contains many contaminants linked to the composition of low-enriched uranium targets and to the alkaline aqueous phase used to carry out the alkaline dissolution of the aforementioned targets.

In addition, these zeolites, like all gas absorbers, are heat sensitive and display a behaviour that is highly dependent on the temperature.

Finally, these zeolites are also known to purify the noble gases using the atmosphere. Their selectivity and their affinity with respect to these noble gases (xenon, krypton, etc.), are particularly high. Therefore it is reported in document XPS Characterization of Silver Exchanged ETS-10 and Mordenite Molecular Sieves—A. Anson and coll., Journal of Nanoscience and Nanotechnology, vol 9—3134-3137—2009 that these zeolites present an affinity for argon, but also for xenon, krypton and other noble or rare gases.

It therefore surprisingly appeared that it was possible to connect the dissolver, namely the container wherein the alkaline dissolution of these uranium targets was produced to a column containing zeolites doped with silver, preferably chosen from the group consisting of aluminosilicates doped with silver, titanosilicates doped with silver and mixtures thereof for the purpose of capturing the xenon in the form of radioisotopes and to selectively recover it from the mixture formed by the gaseous phase which is produced during the alkaline dissolution.

Indeed, although the capture of xenon by these zeolites was known, it was certainly not obvious that in a method for producing radioisotopes on an industrial scale, the gaseous phase, therefore the composition is variable, but also changing over the course of time during the dissolution, would make it possible to significantly capture the xenon by adsorption. The radiation emitted by the various isotopes of adsorbed xenon can however lead to overheating (local) of the zeolite which could modify the adsorption-desorption balance of this noble gas.

It was therefore possible according to the present invention to capture on a zeolite doped with silver, preferably chosen from the group consisting of aluminosilicates doped with silver, titanosilicates doped with silver and mixtures thereof, selectively, without damaging the zeolite but also to selectively recover the fraction of xenon radioisotopes, in particular Xe-133 with the purpose of valorising it as a radioisotope for medical use, said fraction of xenon radioisotopes having a radiochemical purity that is sufficient to satisfy the criteria of European pharmacopeia, certain isotopes having a decay that is rapid enough to decay by themselves.

Advantageously, according to the present invention, the method further comprises a step of flushing said alkaline slurry with a rare gas, in particular with helium or argon making it possible to drive said gaseous phase containing said xenon radioisotopes, in particular Xe-133 for the purpose of isolating it.

Indeed, although zeolites have a high affinity for noble gases in general, it was possible according to the present invention to facilitate the driving of the gaseous phase to a device for the isolation of the fraction of xenon radioisotopes, in particular Xe-133, using argon or helium when the other gases such as for example air are to be proscribed because they are not inert and cause secondary reactions that are to be avoided.

In a first advantageous embodiment of the method according to the present invention, said zeolite is an aluminosilicate zeolite of the chabazite type, doped with silver, available for example from the company Alberta Adsorbent Inc. (US).

In a preferred mode of the present invention, said zeolite is a titanosilicate zeolite of the ETS type, preferably ETS-10, doped with silver available for example from the company Alberta Adsorbent Inc. (US).

Advantageously, said recovery of a fraction containing said xenon radioisotopes, in particular Xe-133 is a step of hot desorbing of said xenon, in particular Xe-133 of said zeolite doped with silver.

In an alternative embodiment of the method according to the present invention, said step of hot desorption is carried out at a temperature between 150° C. and 200° C., preferably between 160° C. and 170° C.

Preferably, in another advantageous form of the method according to the present invention, said step of adsorbing xenon radioisotopes, in particular Xe-133 on a zeolite doped with silver is carried out at ambient temperature.

In a particular embodiment according to the present invention, said step of adsorbing Xenon radioisotopes, in particular Xe-133 on a zeolite doped with silver is carried out at a flow rate of 50 to 400 litres/h, preferably from 80 to 120 litres/h, in particular of about 100 litres/hour.

Advantageously, in the method according to the present invention, said zeolite doped with silver is contained in a column comprising an inlet and an outlet for a gas, said column comprising from 5 to 100 g, preferably from 5 to 10 g of zeolite doped with silver, said inlet for a gas being connected, directly or indirectly, to a dissolver wherein said alkaline dissolution takes place, said inlet for a gas of the column being located under the zeolite doped with silver, contained in the column, said outlet for a gas making possible the exiting from said gaseous phase outlet, said gaseous phase exiting said column in the form of a xenon radioisotope-depleted gaseous phase, in particular Xe-133.

Indeed, depending on the production of local overheating due to the rays given off by the adsorbed xenon, it may be required to increase the size of the column in order to alleviate the overheating phenomenon.

In yet another advantageous alternative of the present invention, the method further comprises a step of closing off said column, a disconnection of said column from said dissolver as well as a conditioning of said column in a sealed and shielded container for the purpose of sending it to a customer.

In a preferred embodiment of the method according to the present invention, said outlet for a gas comprises two outlets, a first allowing for the exiting of said xenon radio-isotope-depleted gaseous phase, in particular Xe-133 and a second outlet, connected to a bulb intended to recover said fraction of xenon radioisotopes, in particular Xe-133 by thermal desorption.

In a preferred mode of the present invention, said zeolite doped with silver is a zeolite presenting an impregnation rate of silver $Ag^+$ between 10 and 45% by weight with respect to the weight of said zeolite.

Other embodiments of the method according to the invention are described in the accompanying claims.

The invention also has for object a fraction of xenon radioisotopes, in particular Xe-133 in the form of a column of zeolite doped with silver, conditioned in a sealed and shielded container whereon said fraction of xenon radioisotopes, in particular Xe-133 is adsorbed, said column containing from 5 to 100 g, preferably from 5 to 10 g of zeolite doped with silver.

In a first advantageous embodiment of the fraction of xenon radioisotopes, in particular Xe-133 according to the present invention, said zeolite is an aluminosilicate zeolite of the chabazite type, doped with silver, available for example from the company Alberta Adsorbent Inc. (US).

In a preferred mode of the present invention, said zeolite is a titanosilicate zeolite of the ETS type, preferably ETS-10, doped with silver available for example from the company Alberta Adsorbent Inc. (US).

In a preferred mode of the present invention, said zeolite doped with silver is a zeolite presenting an impregnation rate of silver $Ag^+$ between 10 and 45% by weight with respect to the weight of said zeolite In an advantageous alternative, the fraction of xenon radioisotopes, in particular Xe-133 is in the form of a sealed bulb, conditioned in a shielded container, containing said fraction of xenon radioisotopes, in particular Xe-133 in the form of gas.

In yet another advantageous embodiment, said fraction of xenon radioisotopes, in particular Xe-133 is obtained by the method according to the invention.

Other embodiments of the fraction according to the invention are described in the accompany claims.

Other characteristics, details and advantages of the invention shall appear in the description provided hereinafter, in a non-limiting manner.

When uranium 235 is bombarded with neutrons, it forms fission products that have a lower mass and which themselves are unstable. These products generate other radioisotopes via a disintegration cycle. It is especially in this way that the radioisotopes Mo-99, Xe-133 and I-131 are produced.

The low-enriched uranium targets contain an aluminium alloy that contains uranium. The content in enriched uranium with respect to the total weight of uranium is a maximum of 20%, and typically of around 19%. The low-enriched uranium targets are dissolved during an alkaline dissolution phase in the presence of NaOH (at about 4 mol/l or more) and $NaNO_3$ (at about 3.5 mol/l). During the dissolution, a slurry is formed as well as a gaseous phase of Xe-133. The slurry contains a solid phase mainly formed of uranium and of hydroxides of fission products and a liquid phase of molybdate ($MoO_4^-$) and of iodine 131 under iodine salts.

The alkaline dissolution phase volume increases with the number of targets, given the very important content in product that cannot be used after dissolution of the targets. The dissolution of the aluminium of the target is an exothermic reaction.

The gaseous phase of Xenon is recovered by isolation using a zeolite, in particular a zeolite doped with silver, preferably chosen from the group consisting of aluminosilicates doped with silver, titanosilicates doped with silver and of their mixtures.

In a first advantageous embodiment of the method according to the present invention, said zeolite is an aluminosilicate zeolite of the chabazite type, doped with silver, available for example from the company Alberta Adsorbent Inc. (US).

In another preferred embodiment of the present invention, said zeolite is a titanosilicate zeolite of the ETS type, preferably ETS-10, doped with silver available for example from the company Alberta Adsorbent Inc. (US).

The zeolite doped with silver is more preferably a zeolite presenting an impregnation rate of silver $Ag^+$ between 10 and 45% by weight with respect to the weight of said zeolite During the forming of the slurry, fission products of the uranium are released, certain in soluble forms, others in the form of gas. This is among other things the case with xenon and krypton, which are therefore in a gaseous phase. The gaseous phase exits the liquid medium and remains confined in the sealed container wherein the dissolution takes place. The sealed container comprises a gaseous phase outlet connected to a gaseous phase inlet of a column containing said zeolite doped with silver, isolated from the outside environment, but also an inlet for a purge gas.

The gaseous phase contains ammonia ($NH_3$) that comes from the reduction of the nitrates and the main gaseous fission products which are Xe-133 and Kr-85

The dissolution is a highly exothermic reaction, which imposes two large refrigerants. However, water vapour is present in the gaseous phase. The gaseous phase is carried away by a vector gas (He or Ar) towards the device for recovering rare gases.

The recovery of xenon is carried out as follows: the gaseous phase leaves the alkaline dissolution sealed container using a carrier gas and is brought to the column containing from 5 to 100 g, preferably from 5 to 10 g of zeolite doped with silver, arranged to collect a fraction of xenon radioisotopes, in particular Xe-133 from a single production. The adsorption of the xenon is carried out at ambient temperature. The flow rate of the supply of the column of zeolite is of about 100 litres/hour.

In an advantageous alternative of the present invention, the method further comprises a step of closing off said column, of disconnecting said column from the dissolution circuit, as well as a conditioning of said column in a sealed and shielded container for the purpose of sending it to a customer.

In another preferred embodiment of the method according to the present invention, said outlet for a gas comprises two outlets, a first allowing for the exiting of said xenon radioisotope-depleted gaseous phase, in particular Xe-133 and a second outlet, connected to a bulb intended to recover said fraction of xenon radioisotopes, in particular Xe-133.

It is understood that the present invention is in no way limited to the embodiments described hereinabove and that many modifications can be made thereto without departing from the scope of the accompanying claims.

The invention claimed is:

1. A fraction of xenon radioisotopes, wherein the xenon radioisotopes are Xe-133, and wherein the fraction of xenon radioisotopes is a fraction of xenon isotopes recovered from a gas containing contaminants released from dissolution of low enriched uranium targets and having a radiochemical purity of medical use, in the form of a column of zeolite doped with silver, whereon said fraction of xenon radioisotopes is adsorbed, said column containing from 5 g to 10 g of zeolite doped with silver, and wherein the column is conditioned in a sealed and shielded container.

2. The fraction of xenon radioisotopes of claim 1, wherein the zeolite is a titanosilicate zeolite of the ETS type, doped with silver.

3. The fraction of xenon radioisotopes of claim 1, wherein the zeolite is an aluminosilicate zeolite of the chabazite type, doped with silver.

4. The fraction of xenon radioisotopes of claim 1, wherein zeolite doped with silver is a zeolite having an impregnation rate of silver Ag+ between 10% and 45% by weight with respect to the weight of said zeolite.

5. The fraction of xenon radioisotopes of claim 1, wherein the column comprises an inlet for a gas configured for being connected to a dissolver, said inlet being located under the zeolite doped with silver contained in the column, and an outlet for a gas configured for allowing a gas to exit the column in the form of a xenon radioisotope-depleted gaseous phase.

6. The fraction of xenon radioisotopes of claim 5, wherein the column further comprises a second outlet for a gas, said outlet connected to a bulb configured for recovery of the fraction of xenon radioisotopes.

7. The fraction of xenon radioisotopes of claim 1, wherein the fraction of xenon radioisotopes is produced by the steps of:
   (a) dissolving low-enriched uranium targets by contacting with base to provide an alkaline slurry and a gaseous phase containing xenon radioisotopes,
   (b) isolating the gaseous phase containing said xenon radioisotopes, and
   (c) recovering a fraction containing said xenon radioisotopes,
   wherein the isolation of the gaseous phase containing the xenon radioisotopes comprises a step of adsorbing xenon radioisotopes on a zeolite doped with silver.

8. The fraction of xenon radioisotopes of claim 7, wherein the steps further comprise a step of flushing said alkaline slurry with a rare gas making it possible to drive said gaseous phase containing said xenon radioisotopes for the purpose of isolating it.

9. The fraction of xenon radioisotopes of claim 7, wherein said recovery of a fraction containing said xenon radioisotopes is a step of hot desorbing of said xenon of said zeolite doped with silver.

10. The fraction of xenon radioisotopes according to claim 9, wherein said step of hot desorption is carried out at a temperature comprised between 150° C. and 200° C. or between 160° C. and 170° C.

11. The fraction of xenon radioisotopes of claim 7, wherein said step of adsorbing Xenon radioisotopes on a zeolite doped with silver is carried out at ambient temperature.

12. The fraction of xenon radioisotopes of claim 7, wherein said step of adsorbing xenon radioisotopes on a zeolite doped with silver is carried out at a flow rate of 50 to 400 litres/h, 80 to 120 litres/h, or 100 litres/hour.

13. The fraction of xenon radioisotopes of claim 7, wherein said zeolite doped with silver is contained in a column comprising an inlet and an outlet for a gas, said column comprising from 5 to 10 g of zeolite doped with silver, said inlet for a gas being connected to a dissolver wherein said alkaline dissolution takes place, said inlet for a gas of the column being located under the zeolite doped with silver, contained in the column, said outlet for a gas making possible the exiting from said gaseous phase outlet, said gaseous phase exiting said column in the form of a xenon radioisotope-depleted gaseous phase.

* * * * *